United States Patent
Tolia et al.

(10) Patent No.: US 8,499,121 B2
(45) Date of Patent: Jul. 30, 2013

(54) METHODS AND APPARATUS TO ACCESS DATA IN NON-VOLATILE MEMORY

(75) Inventors: Niraj Tolia, Sunnyvale, CA (US); Nathan Lorenzo Binkert, Redwood City, CA (US); Jichuan Chang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 147 days.

(21) Appl. No.: 13/222,919

(22) Filed: Aug. 31, 2011

(65) Prior Publication Data
US 2013/0054869 A1 Feb. 28, 2013

(51) Int. Cl.
*G06F 12/00* (2006.01)

(52) U.S. Cl.
USPC .......................... 711/118; 711/103; 711/108

(58) Field of Classification Search
USPC .......................................... 711/118, 103, 108
See application file for complete search history.

(56) References Cited

PUBLICATIONS

Venkataraman et al., "Consistent and Durable Data Structures for Non-Volatile Byte-Addressable Memory," In Proceedings of the 9th USENIX Conference on File and Storage Technologies (FAST '11), San Jose, CA, Feb. 2011. (15 pages).
"Schooner MySQL® with Active Cluster™," http://www.schoonerinfotech.com/, retrieved online Jun. 22, 2011. (1 page).
Gear6, "Gear6 Memcached—An enhanced distribution of Memcached that includes No SQL support," http://www.gear6.com/memcached-product/memcached, retrieved online Jun. 22, 2011. (2 pages).
Birrell et al., "A Design for High-Performance Flash Disks," ACM Operating Systems Review, 41(2), Apr. 2007. (6 pages).
Qureshi et al., "Scalable High Performance Main Memory System Using Phase-Change Memory Technology," ISCA'09, Jun. 20-24, 2009, Austin, Texas. (10 pages).

*Primary Examiner* — Hashem Farrokh (57) ABSTRACT

Example methods, apparatus, and articles of manufacture to access data are disclosed. A disclosed example method involves generating a key-value association table in a non-volatile memory to store physical addresses of a data cache storing data previously retrieved from a data structure. The example method also involves storing recovery metadata in the non-volatile memory. The recovery metadata includes a first address of the key-value association table in the non-volatile memory. In addition, following a re-boot process, the locations of the key-value association table and the data cache are retrieved using the recovery metadata without needing to access the data structure to re-generate the key-value association table and the data cache.

17 Claims, 5 Drawing Sheets

FIG. 5

METHODS AND APPARATUS TO ACCESS DATA IN NON-VOLATILE MEMORY

BACKGROUND

Local memories in computers are often used to locally cache information using key-value stores, serving as cache layers between web front-ends and backend databases. For example, memcached is one such key-value store implementation that has been widely adopted by large-scale online service providers for fast retrieval of key-value records while reducing load pressures on databases. Traditional memcached layers are typically built using commodity servers with volatile dynamic random access memory (DRAM).

DETAILED DESCRIPTION

Accessing information across a networked or internetworked environment involves accessing data sources via one or more networks. For example, in web-based communications, data used to render information on web pages at a client computer is often stored at different data sources. Repeatedly accessing such data directly from their respective data sources can be time consuming for client computers and can be an inefficient use of resources for the data sources, which must process each data access request. To facilitate accessing data located across two or more separate data sources, key-value caches are often employed so that key-value cache servers can quickly retrieve locally cached data that was previously retrieved from a remote data source. Key-value caches typically reside between client computers and the data sources to facilitate local retrieval of previously accessed data that would otherwise need to be retrieved from the originating data sources. When a client computer initiates data retrieval, the client computer queries a key-value association table for the location of the desired data in a local cache. If a key-value pair was previously stored in the key-value association table for the desired data, the key-value association table returns a pointer to the desired data. Using prior art key-value caches, a virtual-to-physical address translation is performed on the pointer to access the desired data in the local cache as shown in FIG. 2.

Figure 2:
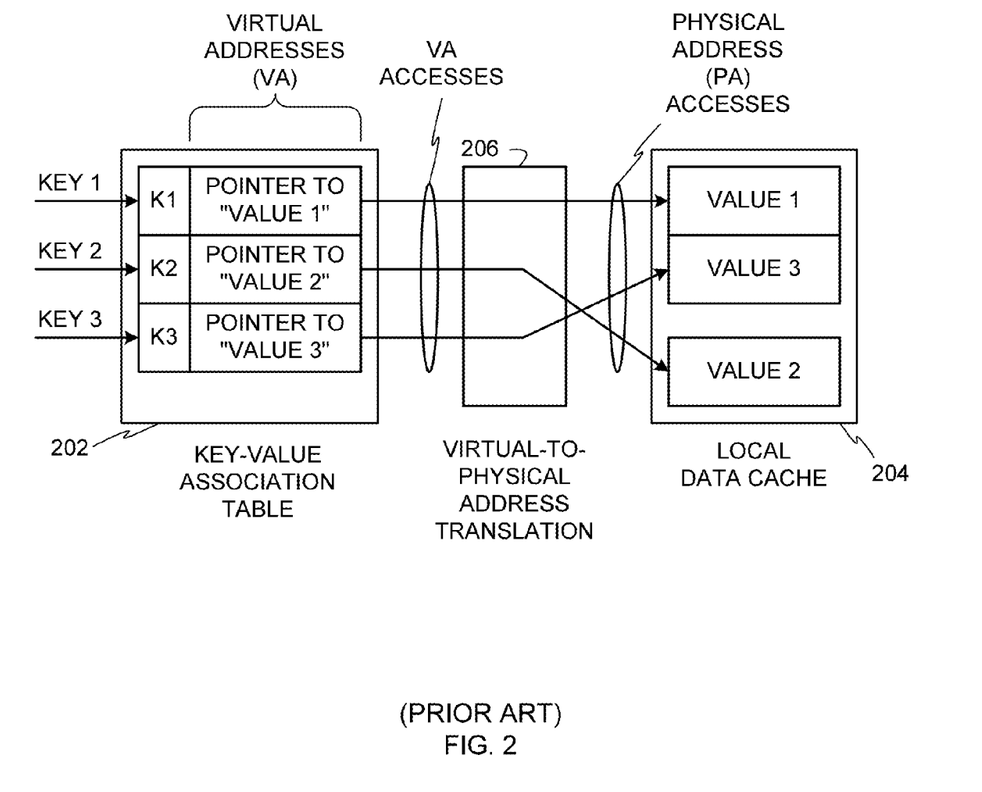
FIG. 2 illustrates a prior art key-value association table in connection with a volatile data cache used to locally cache data.

Traditional key-value association tables such as the key-value association table 202 of FIG. 2 are typically implemented using volatile memories such as dynamic random access memory (DRAM). However, drawbacks of such volatile-memory-based implementations arise when the key-value association tables are affected by system crashes or power outages. Following a re-boot process after a system crash or power outage of a computer having one or more volatile key-value association tables such as the key-value association table 202, the key-value association table(s) are no longer valid due to their deletion from the volatile memory or due to possible memory loss resulting from the system crash or power outage. As such, the key-value association table 202 is not used but instead is re-built based on future data retrievals. This approach adversely impacts performance of a computer as it often involves accessing an originating data source to retrieve data that was previously locally cached using the key-value association table 202. In other words, instead of using previously locally cached data, the data is again retrieved from the original source. Thus, computers subject to such system crashes and/or power outages load respective originating data sources by re-requesting previously cached data from those data sources, which adversely impacts performance of the requesting device and the servers hosting the originating data sources. Such data querying can use significantly high levels of resources to process such data queries.

Unlike traditional techniques used to store key-value association tables to identify locally cache data, example methods, apparatus, and/or articles of manufacture disclosed herein may be advantageously used to store key-value association tables in non-volatile memory (NVM) such that the key-value association tables remain persistently stored and reliable in the NVM even after a system crash and/or a power outage of computers storing the key-value association tables. In this manner, the need to re-build key-value association tables following system crashes and/or power outages can be advantageously reduced and/or avoided. In turn, excess burdens that would otherwise be placed on local computers and/or originating data sources during re-building of key-value association tables following system crashes and/or power failures are substantially reduced or eliminated because the key-value association tables remain persistently stored in NVM and need not be re-built. In addition, examples disclosed herein enable key-value caches to be recognized and useable by system software (e.g., operating systems) following a reboot process. That is, examples disclosed herein provide persistent key-value caches that are readily ready for access by system software following a hardware and operating system reboot.

Some disclosed example methods to access data using non-volatile key-value association tables involve building a key-value association table in a non-volatile memory to store physical cache addresses of data previously retrieved from an originating data structure or data source and presently stored in a cache. In addition, recovery metadata is stored at a fixed location in the non-volatile memory. The recovery metadata includes a first address of the key-value association table in the non-volatile memory. In this manner, the recovery metadata can be used to retrieve the location of the key-value association table in the non-volatile memory following a re-boot process without needing to access the originating data structure to re-generate the key-value association table and/or the data cache.

In some disclosed examples, the recovery metadata further includes a size of the key-value association table and a second address of the data cache. In some examples, the re-boot process is performed in response to a system crash or a power failure of a device storing the key-value association table, and the key-value association table remains persistently stored in the non-volatile memory at the first address throughout and after the system crash or the power failure. In some examples, consistency and durability of the key-value association table and the data cache are maintained during operation and following a system crash or power failure. For example, following a re-boot process, the validity of the physical addresses in the key-value association table is determined based on association management bits stored in association with the physical addresses. In addition, the validity of the data in the data cache is determined based on data management bits stored in association with the data.

In some examples, a wear-leveling process is employed to adjust the physical placement of data in the data cache, for which the physical location of the data is stored in a physical address field in the key-value association table. In this manner, writes of data are distributed in the data cache in the non-volatile memory. In this manner, useable life of the non-volatile memory can be extended by not overwriting any particular memory cell to the point at which it would wear significantly faster than other memory cells of the same non-volatile memory. Non-volatile memories have relatively lower write endurances than volatile memories. Wearing any memory cell disproportionately faster than other memory cells of the same non-volatile memory would otherwise result in decreased reliability of that memory cell and, in some instances, decreased reliability of the entire non-volatile memory containing the worn memory cell.

Example methods, apparatus, and/or articles of manufacture disclosed herein can be advantageously used in connection with network accessible data, inter-network accessible data (e.g., web-based information used to render web pages), and/or local data stored on the same device or machine that stores or hosts the key-value association table and data cache. That is, instead of using traditional techniques requiring a re-build of key-value association tables and associated data caches following system crashes and/or power failures of devices storing the key-value association tables and data caches, examples disclosed herein enable such devices to relatively quickly re-establish use of previously created key-value association tables and associated data caches following re-boot processes caused by the system crash(es) and/or power failure(s). Storing and accessing key-value association tables and data caches in non-volatile memories as disclosed herein also advantageously reduces or eliminates excessive traffic loads to originating data sources following system crashes and/or power failures of machines storing the key-value association tables.

Figure 1:
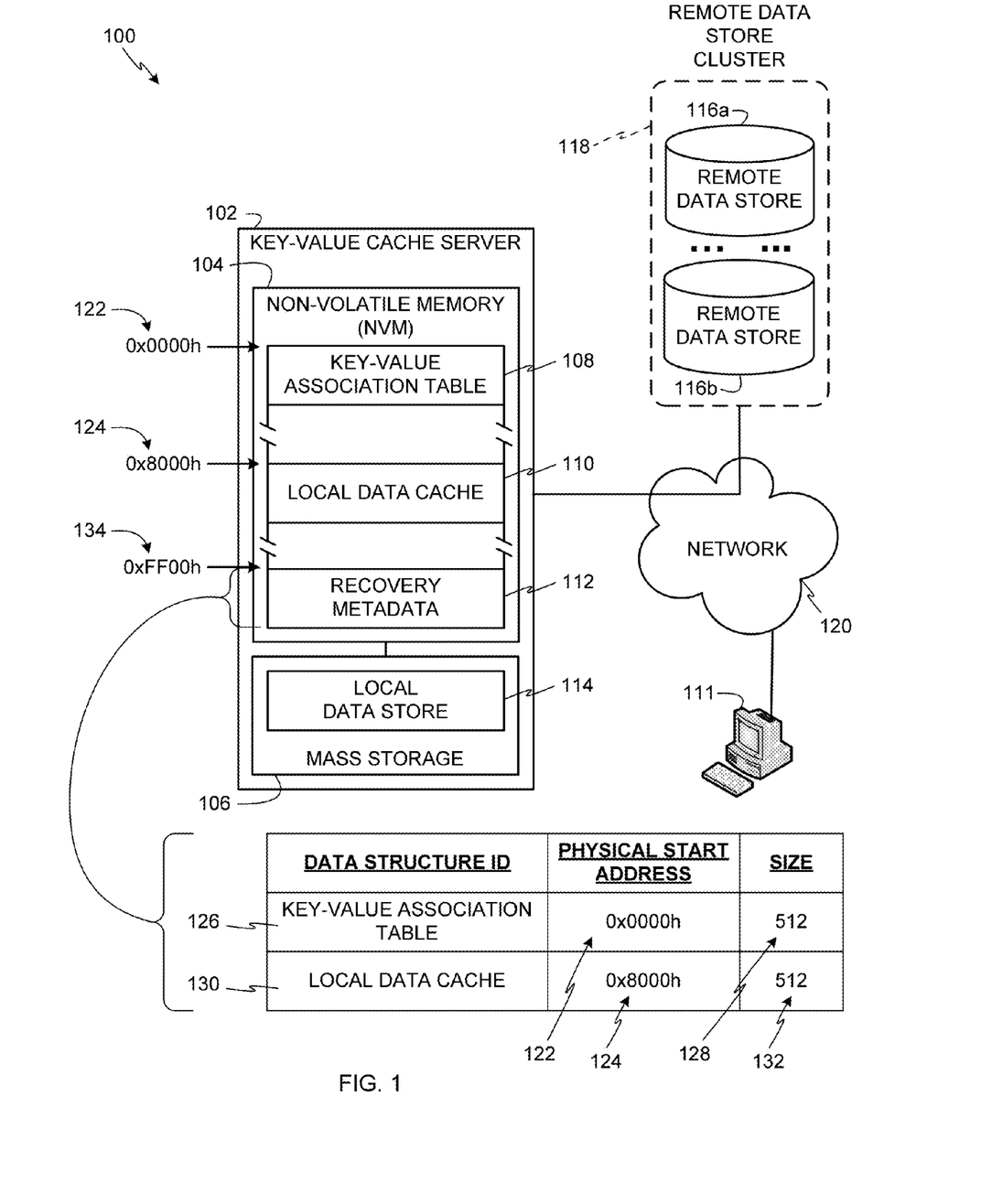
FIG. 1 illustrates an example key-value cache server having a non-volatile key-value association table and non-volatile data cache to facilitate caching data locally from local and/or remote data stores.

Turning to FIG. 1, an example network system 100 is illustrated having a key-value cache server 102 including a non-volatile memory (NVM) memory 104 and a mass storage memory 106. In the illustrated example, the NVM 104 stores a key-value association table 108, an associated local data cache 110, and recovery metadata 112. Although for simplicity of illustration only one key-value association table and associated local data cache are shown in the illustrated example, the key-value cache server 102 may include any number of key-value association tables and/or associated local data caches for access by one or more client devices such as the client device 111. In the illustrated example, the key-value cache server 102 uses the key-value association table 108 to store pointers to data stored in the data cache 110, in which the key-value cache server 102 locally caches data previously retrieved from any originating remote or local data source. In examples disclosed herein, such originating data sources (e.g., data structures storing data) may include data sources locally stored at the key-value cache server 102 such as a local data store 114 stored in the mass storage memory 106 and/or may be remotely located data sources separate from the key-value cache server 102 such as one or more remote data stores 116a-b in a remote data store cluster 118 accessible by the key-value cache server 102 via a network 120.

The key-value cache server 102 and/or the client device 111 of the illustrated example may be any processor system, computing device, and/or machine including, for example, personal computers, servers, mobile devices, tablets, cellular phones, Internet appliances, etc. In the illustrated example, the network 120 may be one or more public networks such as the Internet and/or one or more private networks such as one or more enterprise networks, and the data stores 116a-b may store, for example, website data and/or any other data served by a server via the network 120 for access by clients such as the client device 111.

The mass storage memory 106 of the illustrated example is a non-volatile memory and may be implemented using any type of mass storage non-volatile memory including, for example, a magnetic hard disk drive, an optical drive, a solid state memory drive, etc. The NVM 104 of the illustrated example may be implemented using any type of re-writeable NVM including, for example, flash memory, memristor memory, phase change memory (PCM), magnetic hard disk drive memory, etc. In this manner, the key-value association table 108, the local data cache 110, and the recovery metadata 112 of the illustrated example remain persistently stored in the NVM 104 without deletion or loss of data when the key-value cache server 102 experiences system crashes and/or power failures leading to re-booting of the key-value cache server 102.

During operation of the client device 111, the client device 111 executes applications and queries the key-value cache server 102 to retrieve data from the local data store 114 and/or query one or more of the remote data stores 116a-b for data. Additionally or alternatively, the key-value cache server 102 retrieves data from one or more of the remote data stores 116a-b for corresponding websites accessed by the client device 111. In the illustrated example, access speeds of the mass storage memory 106 and latencies for accessing data from the remote data stores 116a-b are relatively slower than access speeds of the NVM 104. As such, the key-value cache server 102 uses the key-value association table 108 and the local data cache 110 to cache previously accessed data (e.g., data from the local data store 114 and/or one or more of the remote data stores 116a-b) in the local data cache 110. In this manner, any subsequent accesses to the same data can be made by accessing the key-value association table 108 and the local data cache 110 rather than re-requesting the same data from the originating data source(s) (e.g., data from the local data store 114 and/or one or more of the remote data stores 116a-b). This advantageously improves performance of applications executed by the client device 111 and/or web pages rendered thereby.

When the key-value cache server 102 initially instantiates and builds the key-value association table 108 and its associated local data cache 110, the key-value cache server 102 maps the memory locations of the key-value association table 108 and the local data cache 110 in its memory map. For example, the key-value association table 108 of the illustrated example has a fixed key-value starting address 122 of 0x0000h and the local data cache 110 of the illustrated example has a fixed cache starting address 124 of 0x8000h. The starting addresses of 0x000h and 0x8000h are shown by way of example, and any other starting addresses may be used instead. In this manner, the key-value cache server 102 can access the key-value association table 108 and the local data cache 110 based on their mapped fixed address locations. In known key-value association tables, such address location mappings are lost during system crashes and/or power outages such that a re-booted device must re-instantiate and/or re-build its key-value association tables and re-map the tables into its memory map. Examples disclosed herein overcome this by using the NVM 104 to persistently store address locations 122 and 124 of the key-value association table 108 and its associated local data cache 110 in the recovery metadata 112.

As shown in FIG. 1, the recovery metadata 112 of the illustrated example persistently stores starting addresses and sizes of the key-value association table 108 and its associated local data cache 110 in the NVM 104. For example, the recovery metadata 112 stores a data structure identifier (ID) 126 of the key-value association table 108 in association with the key-value start address 122 and its size 128. In addition, the recovery metadata 112 stores a data structure identifier (ID) 130 of the local data cache 110 in association with the cache start address 124 and its size 132. In the illustrated example, the start addresses 122 and 124 are physical addresses instead of virtual addresses. In this manner, re-allocations of virtual addresses following re-boot processes do not affect the known, fixed addresses of the key-value association table 108 and the local data cache 110 as stored in the recovery metadata 112.

In addition, to enable the key-value cache server 102 to bootstrap access to the key-value association table 108 and the local data cache 110 following a re-boot process, the recovery metadata 112 is stored at a fixed physical address noted as a recovery metadata starting address 134 of the NVM 104. The recovery metadata starting address 134 is selected based on having a low or no likelihood of being allocated for other uses by an operating system (OS) of the key-value cache server 102 by way of, for example, a 'malloc' function used by applications, programs or processes to receive allocated memory in virtual memory space. Such a malloc memory allocation function may be called numerous times during a system boot process of the key-value cache server 102. The recovery metadata starting address 134 of 0xFF00h is selected by way of example, and any other starting address having a low or no likelihood of being allocated for other uses by an OS may be used instead. In some examples, the malloc library used in the key-value cache server 102 may be modified such that the physical starting address 134 of the recovery metadata 112 is not allocated for other uses by the OS in response to malloc function calls.

Turning again briefly to FIG. 2, the prior art key-value association table 202 stores and provides virtual addresses of data cached in a corresponding prior art local data cache 204. To access data in the prior art local data cache 204 a virtual-to-physical address translation 206 is performed to determine the physical address location of the data to be accessed. This prior art technique of pointing to virtual addresses has several drawbacks that prevent key-value association tables from usefully surviving system crashes and/or power failures. For example, during a re-boot process, an OS re-establishes its virtual memory space, which is typically not the same as its virtual memory space during its operation prior to a system crash and/or power failure. That is, reallocation of virtual memory space is non-deterministic because the OS may re-allocate different virtual memory addresses to different components or objects requesting memory space. Thus, the prior art local data cache 204 will be allocated different virtual memory address spaces after each re-boot and/or will be allocated a virtual memory address space that is not guaranteed to be the same after each re-boot. Thus, even if the prior art key-value association table 202 were to survive a re-boot process following a system crash and/or power failure, the virtual addresses stored therein would no longer be guaranteed to correctly point to respective data in the prior art local data cache 204 due to the re-allocation of virtual memory space for the local data cache 204. An attempt to use the virtual address pointers stored in the prior art key-value association table 202 would likely result in the virtual-to-physical address translation 206 providing physical addresses that do not correspond to the local data cache 204 or correct data values in the local data cache 204.

Figure 3:
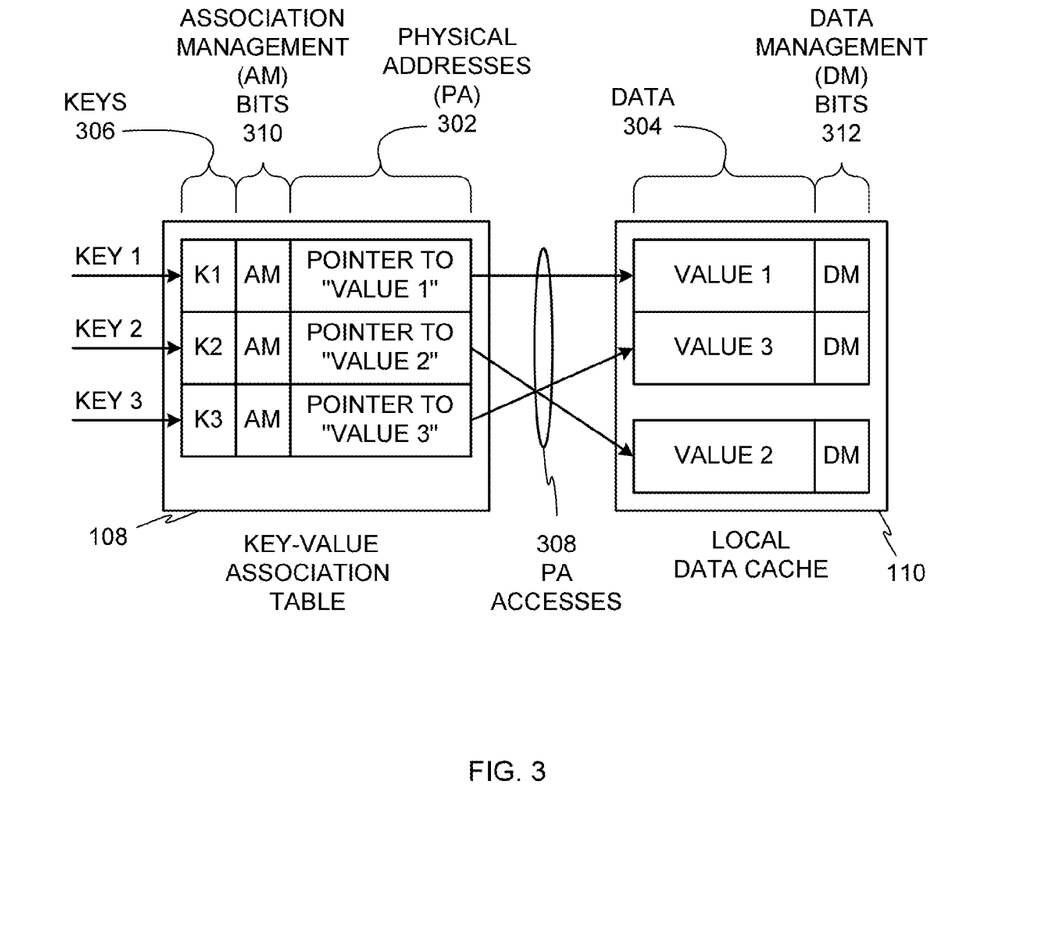
FIG. 3 illustrates the example key-value association table of FIG. 1 providing physical addresses of data locally cached in its associated local data cache.

Unlike the prior art key-value association table 202 of FIG. 2, which stores pointers to virtual addresses for data stored in the volatile local data cache 204, examples disclosed herein store physical addresses in key-value association tables (e.g., the key-value association table 108 of FIG. 1) pointing to physical address locations of corresponding data values stored in local data caches (e.g., the local data cache 110 of FIG. 1). FIG. 3 is a detailed illustration of the example key-value association table 108 of FIG. 1 storing physical addresses (PA) 302 of data 304 locally cached in the local data cache 110. In addition, the example key-value association table 108 stores keys 306 in association with corresponding ones of the physical addresses 302 to form key-value pairs useful to the key-value cache server 102 of FIG. 1 to locate and retrieve the data 304 from the local data cache 110. In some examples, the key-value association table 108 is implemented as a hash table. Unlike the prior art key-value association table 202, which stores virtual addresses as discussed above, the example key-value association table 108 of FIG. 3 stores physical addresses, which enable the key-value association table 108 to persistently maintain the correct physical addresses of the local data cache 110 in the NVM 104 (FIG. 1) through system crashes and/or power failures. In addition, storing the physical addresses 302 in the key-value association table 108 enables omitting a virtual-to-physical address translation such as the virtual-to-physical translation 206 used in connection with the prior art key-value association table 202 of FIG. 2. This, in turn, improves cache access performance of the key-value cache server 102 and/or the client device 111. That is, because the key-value association table 108 stores the physical addresses 302, the key-value cache server 102 can access the data 304 based on such physical addresses 302 using physical address accesses 308 without having to perform virtual-to-physical address translations, which could otherwise require one or more additional processing cycles or cache access cycles.

In some examples, memory management functions of an OS may be modified or configured to skip virtual-to-address translation operations for accesses to the key-value association table 108 and the local data cache 110. For example, the memory manager of an OS may be configured to, during a boot process, access the physical location of the recovery metadata 112 of FIG. 1 to determine the physical addresses and sizes of the key-value association table 108 and the local data cache 110. In this manner, the OS memory manager can suppress or not perform virtual-to-physical address translations for any subsequent data accesses to the physical address spaces of the key-value association table 108 and the local data cache 110.

In operation, for any one of the keys 306, the key-value association table 108 of the illustrated example returns a physical address pointer (e.g., one of the physical addresses 302) pointing to the local data cache 110 at a corresponding one of the data 304 associated with the key. However, if a key-value pair does not exist in the key-value association table 108 and/or the local data cache 110 for requested data, the key-value association table 108 returns an empty pointer. When an empty pointer is returned, the key-value cache server 102 accesses the desired data from its originating data source (e.g., the local data store 114 and/or the remote data store(s) 116*a-b* of FIG. 1) using a structured query language (SQL) query or any other type of data access command. The key-value cache server 102 then creates a key-value pair by storing a physical address specifying the location of the data in the local data cache 110 in the key-value association table 108 and storing the corresponding data in the local data cache 110.

In the illustrated example, the access commands to the key-value association table 108 are put, get, update, delete, etc. For example, 'put' (e.g., put(k,v), in which 'k'=a key and 'v'=a corresponding data value) adds a new key-value pair, which involves (1) allocating space and copying data from a data source (e.g., the local data store 114 and/or the remote data store(s) 116*a-b* of FIG. 1) and (2) creating a key-value pair, which involves storing a key 306 in association with a physical address 302 in the key-value association table 108 that points to a corresponding data value 304 in the local data cache 110. Similarly, multiple updates to the NVM 104 are used for other operations such as update, delete, etc.

In the illustrated example of FIG. 3, the key-value association table 108 includes association management (AM) bits 310 for corresponding ones of the key-value pairs, and the local data cache 110 stores data management (DM) bits 312 for corresponding ones of the data entries 304. In the illustrated example, the AM bits 310 store bit values used to persistently maintain consistency and durability of the physical addresses 302 and keys 306 stored in the key-value association table 108. In addition, the DM bits 312 of the illustrated example store bit values used to persistently maintain consistency and durability of the data 304 stored in the local data cache 110.

To maintain state consistency of the key-value association table 108 across system crashes and/or power failures, examples disclosed herein perform data structure updates for application-level commands (e.g., put, delete, update, etc.) as group committed updates. For example, redo logs and durable writes are used to substantially prevent or reduce the likelihood that the information stored in the key-value association table 108 and the local data cache 110 become inconsistent, invalid, or unreliable.

As used herein, durability (or being durable) means that a fail-stop failure or any other type of failure (e.g., a system crash, a power failure, etc.) does not result in loss of committed data in the key-value association table 108 or the local data cache 110. As used herein, consistency (or being consistent) means that information stored in the key-value association table 108 and/or the local data cache 110 remains valid and persistent after every update operation. If a failure occurs during an update, the key-value association table 108 and the local data cache 110 are restored or reverted to a prior consistent and valid state before any further updates are applied.

In some examples, the key-value association table 108 and the local data cache 110 are configured to be consistent and durable by building and maintaining a limited number of respective versions of those data structures with the constraint that updates should not weaken the structural integrity of an older version of the data structures and that updates to the key-value association table 108 and the local data cache 110 are atomic. Further, each update is group-committed resulting in the creation of new versions of the key-value association table 108 and the local data cache 110. Such a versioning scheme allows the key-value association table 108 and the local data cache 110 to provide consistency without the additional overhead of logging or shadowing. In turn, this provides a substantially high level of certainty that a failure (e.g., a system crash and/or a power failure) occurring between update operations will not leave the information stored in the key-value association table 108 or the local data cache 110 in an inconsistent state. In examples disclosed herein, the key-value association table 108 and the local data cache 110 use respective ones of the AM bits 310 and the DM bits 312 to indicate when an update has been safely committed. As such, because the key-value association table 108 and the local data cache 110 do not acknowledge completion of an update via the AM bits 310 and the DM bits 312 without safely committing the update to the NVM 104, such use of acknowledges via the AM bits 310 and the DM bits 312 substantially reduces or prevents silent data loss.

In examples disclosed herein, to maintain consistency and durability of the key-value association table 108 and the local data cache 110, the AM bits 310 and the DM bits 312 store several types of information. For example, the AM bits 310 and the DM bits 312 store a version number for the most recent consistent version. The version number is used by threads that wish to read from the data structure. Every update (e.g., put, update, delete, etc.) results in a new version of the key-value association table 108 and the local data cache 110, resulting in an updated version number in the AM bits 310 and the DM bits 312. During update operations, particular types of modification operations are used to ensure that existing data representing older versions is not overwritten. Such types of modification operations include, for example, atomic operations or copy-on-write style changes. After all modifications for an update to the key-value association table 108 and the local data cache 110 have been made persistent and committed in the NVM 104, the most recent consistent version number in the AM bits 310 and the DM bits 312 is updated atomically. To update atomically, updates are completed to new versions of the key-value association table 108 and the local data cache 110 before they are referred to as the most recent versions.

In some examples, the AM bits 310 and the DM bits 312 are also used to manage garbage collection operations. That is, in addition to tracking multiple versions of the key-value association table 108 and the local data cache 110, the AM bits 310 and the DM bits 312 of some examples also track versions of the key-value association table 108 and the local data cache 110 that are being accessed. In the illustrated example, the AM bits 310 and the DM bits 312 have garbage collection bits or 'old version' bits (e.g., a version number) set therein to indicate older versions of the key-value association table 108 and the local data cache 110. Knowing the oldest version which has a non-zero reference count (i.e., an oldest active version) has two advantages. First, garbage collection (GC) can be used to eliminate older versions of the key-value association table 108 and the local data cache 110 by, for example, comparing version numbers in the AM bits 310 and the DM bits 312 to a threshold. Garbage collection is run in the background and helps limit the space utilization by eliminating information that will not be referenced in the future. Second, knowing the oldest active version of the key-value association table 108 and the local data cache 110 can also improve performance by enabling intelligent space reuse in the key-value association table 108 and the local data cache 110. When creating a new entry, the key-value cache server 102 can proactively reclaim the space used by older inactive versions of the key-value association table 108 and the local data cache 110.

In some examples, the AM bits 310 and the DM bits 312 are used to facilitate recoveries from failures (e.g., system crashes and/or power outages). For example, put, insert, update, and/or delete operations may be interrupted due to an operating system crash and/or power failure. Using examples disclosed herein, the most recent consistent versions of the key-value association table 108 and the local data cache 110 are accessible upon recovery. However, versions of the key-value association table 108 and/or the local data cache 110 that were undergoing an in-progress update at a time of failure are removed because they are uncommitted versions, as indicated by commit bit(s) in the AM bits 310 and the DM bits 312. Such uncommitted versions are handled by using a 'forward garbage collection' procedure during a recovery process at the time of, or following, a re-boot process. This forward garbage collection process involves discarding update operations which were executed after the most recent consistent versions of the key-value association table 108 and/or the local data cache 110. In this manner, newly created entries are discarded while older entries (e.g., entries of the keys 306, the physical addresses 302, and/or the data 304 of FIG. 3) corresponding to the in-progress update operations are reverted.

In some examples, the local data cache 110 is implemented using partitions, each being a fixed chunk size. In such examples, each chunk has a corresponding set of the DM bits 312 shown in FIG. 3 that include a valid bit (e.g., for garbage collection), a continuation bit (e.g., if a data value record 304 spans multiple contiguous chunks), and a length field to define a number of bytes used in the chunk, if the chunk is fragmented. For a hash-based version of the key-value association table 108, multiple keys could result in a hash collision, in which a hash value of a key could point to a different key in the key-value association table 108. To overcome potential data fetch errors that could otherwise result from such hash collisions, the AM bits 310 of the key-value entries in the key-value association table 108 of the illustrated example store skip pointers to indicate the start of a next data chunk record that may match the key hash. Such chunk partitioning of the local data cache 110 and use of skip pointers in the AM bits 310 may be implemented in hardware and/or firmware and/or may bypass the virtual memory management layer in a conventional OS. The AM bits 310 and the DM bits 312 of the illustrated example survive system crashes and/or power failures when stored in connection with the persistent storage of the key-value association table 108 and the local data cache 110 in the NVM 104. In this manner, states of the fixed-chunk size and skip pointer techniques need not be re-built or re-established following a re-boot, leading to relatively shorter system restart times.

Figure 4:
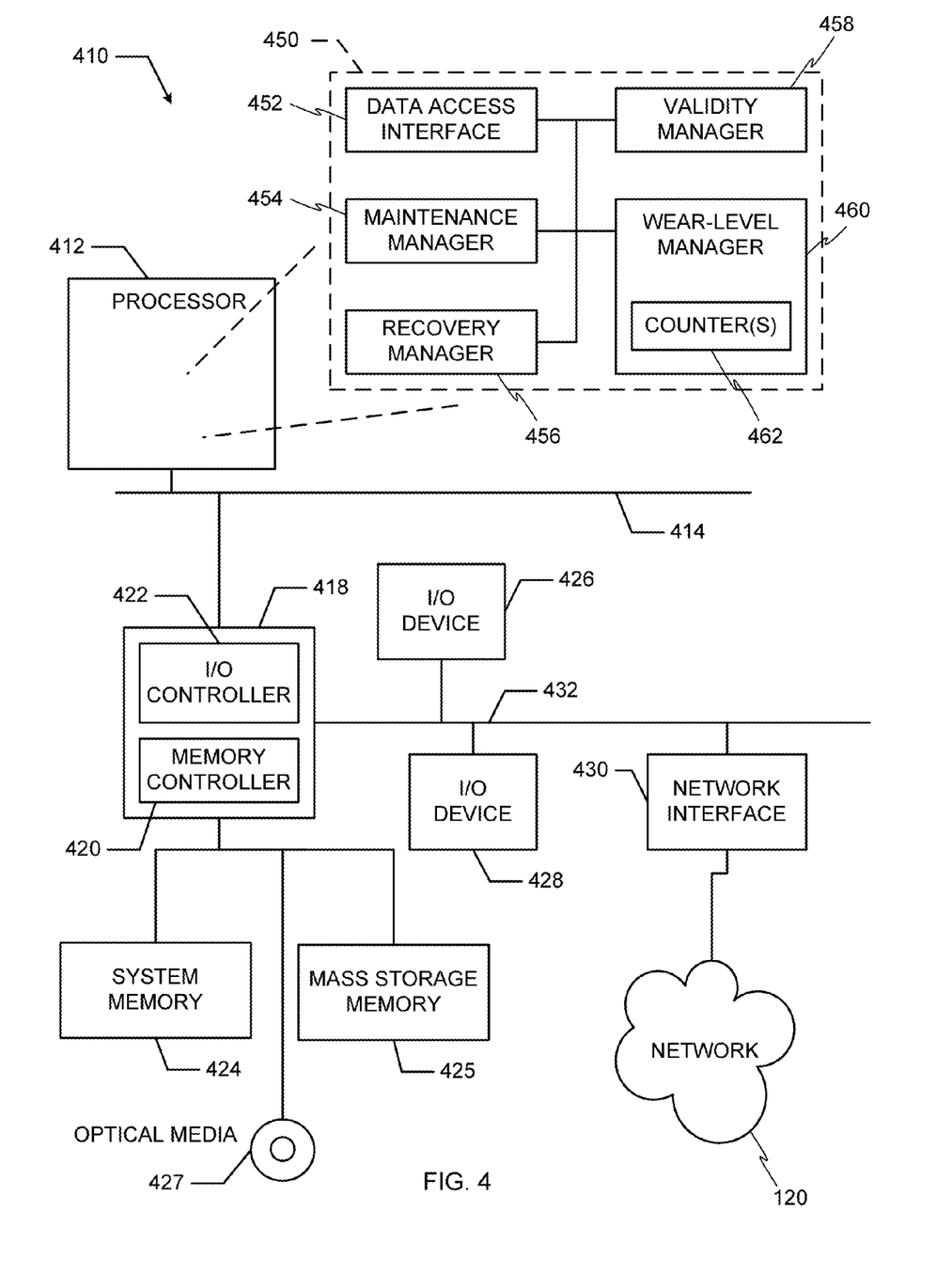
FIG. 4 is an example processor system that can be used to execute the example instructions of FIG. 5 to generate and/or maintain the non-volatile key-value association table and non-volatile data cache of FIGS. 1 and 3.

FIG. 4 is a block diagram of an example processor system 400 that may be used to implement example methods, apparatus, and/or articles of manufacture disclosed herein. For example, the processor system 400 may execute example instructions of FIG. 5 to generate and/or maintain the non-volatile key-value association table 108 and the non-volatile local data cache 110 of FIGS. 1 and 3. For example, the example processor system 410 may be used to implement the key-value cache server 102 of FIG. 1 to generate, build, and/or maintain the non-volatile key-value association table 108 and the non-volatile local data cache 110 of FIGS. 1 and 3, as well as the recovery metadata 112 of FIG. 1.

In the example of FIG. 4, the processor system 410 includes a processor 412 that is coupled to an interconnection bus 414. The processor 412 may be any suitable processor, processing unit, or microprocessor. Although not shown in FIG. 4, the system 410 may be a multi-processor system and, thus, may include one or more additional processors that are identical or similar to the processor 412 and that are communicatively coupled to the interconnection bus 414.

The processor 412 of FIG. 4 is coupled to a chipset 418, which includes a memory controller 420 and an input/output (I/O) controller 422. A chipset provides I/O and memory management functions as well as a plurality of general purpose and/or special purpose registers, timers, etc. that are accessible or used by one or more processors coupled to the chipset 418. The memory controller 420 performs functions that enable the processor 412 (or processors if there are multiple processors) to access a system memory 424, a mass storage memory 425, and/or an optical media 427.

In general, the system memory 424 may include any desired type of volatile and/or non-volatile memory such as, for example, static random access memory (SRAM), dynamic random access memory (DRAM), flash memory, read-only memory (ROM), etc. In some examples, multiple ones of the system memory 424 may be provided. At least one or a portion of the system memory 424 is used to implement the NVM 104 of FIG. 1 to store the non-volatile key-value association table 108, the non-volatile local data cache 110, and the recovery metadata 112. The mass storage memory 425 may include any desired type(s) and/or number of mass storage devices including hard disk drives, optical drives, tape storage devices, etc. In some examples, the mass storage memory 425 may be used to implement the mass storage memory 106 of FIG. 1. The optical media 427 may include any desired type(s) and/or number of optical media such as a digital versatile disc (DVD), a compact disc (CD), and/or a blu-ray optical disc. In some examples, the optical media 427 may be used to implement the mass storage memory 106.

The I/O controller 422 of the illustrated example performs functions that enable the processor 412 to communicate with peripheral input/output (I/O) devices 426 and 428 and a network interface 430 via an I/O bus 432. The I/O devices 426 and 428 may be any desired type of I/O device such as, for example, a keyboard, a video display or monitor, a mouse, etc. The network interface 430 may be, for example, an Ethernet device, an asynchronous transfer mode (ATM) device, an 802.11 device, a digital subscriber line (DSL) modem, a cable modem, a cellular modem, etc. that enables the processor system 410 to communicate with another processor system. In the examples disclosed herein, the network interface 430 enables the key-value cache server 102 to communicate with the remote data stores 116*a-b* (FIG. 1) via the network 120.

While the memory controller 420 and the I/O controller 422 are depicted in FIG. 4 as separate functional blocks within the chipset 418, the functions performed by these blocks may be integrated within a single semiconductor circuit or may be implemented using two or more separate integrated circuits.

Also shown in FIG. 4 is an example apparatus 450 that may be implemented using the processor 412 and/or implemented separate from the processor 412 to generate and/or maintain the non-volatile key-value association table 108 and the non-volatile local data cache 110 of FIGS. 1 and 3, as well as the recovery metadata 112 of FIG. 1. In the illustrated example of FIG. 4, the apparatus 450 is shown as being implemented in the processor 412. Alternatively, all or some of the apparatus 450 may be implemented separate from the processor 412 (e.g., in communication with the interconnection bus 414 to communicate with the above-described components of the processor system 410).

In the illustrated example, the example apparatus 450 includes an example data access interface 452, an example maintenance manager 454, an example recovery manager 456, an example validity manager 458, and an example wear-level manager 460. While an example manner of implementing the apparatus 450 has been illustrated in FIG. 4, one or more of the elements, processes and/or devices illustrated in FIG. 4 may be combined, divided, re-arranged, omitted, eliminated and/or implemented in any other way. Further, the data access interface 452, the maintenance manager 454, the recovery manager 456, the validity manager 458, and the wear-level manager 460 and/or, more generally, the example apparatus 450 of FIG. 4 may be implemented by hardware, software, firmware and/or any combination of hardware, software and/or firmware. Thus, for example, any of the data access interface 452, the maintenance manager 454, the recovery manager 456, the validity manager 458, and the wear-level manager 460 and/or, more generally, the example apparatus 450 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the data access interface 452, the maintenance manager 454, the recovery manager 456, the validity manager 458, and/or the wear-level manager 460 is hereby expressly defined to include a computer readable medium such as a memory, DVD, CD, etc. storing the software and/or firmware. Further still, the example apparatus 450 of FIG. 4 may include one or more elements, processes and/or devices in addition to, or instead of, those illustrated in FIG. 4, and/or may include more than one of any or all of the illustrated elements, processes and devices.

In the illustrated example, the data access interface 452 is provided to build, maintain, and use the key-value association table 108, the local data cache 110, and the recovery metadata 112 of FIGS. 1 and 3 by storing, retrieving, deleting, and/or updating information or data therein. For example, the data access interface 452 stores, retrieves, deletes, and/or updates the keys 306, the AM bits 310, and the physical addresses 302 (FIG. 3) in the key-value association table 108. In addition, the data access interface 452 stores, retrieves, deletes, and/or updates the data 304 and the DM bits 312 (FIG. 3) in the local data cache 110.

To perform maintenance operations on the key-value association table 108, the local data cache 110, and the recovery metadata 112, the apparatus 450 is provided with the maintenance manager 454. In the illustrated example, the maintenance manager 454 instantiates, generates, and/or stores the key-value association table 108, the local data cache 110, and the recovery metadata 112 in the NVM 104 of FIG. 1. The maintenance manager 454 also updates information in the recovery metadata 112 and provides the recovery metadata starting address 134 of the recovery metadata 112 to the recovery manager 456 so that the recovery manager 456 can locate the recovery metadata 112 following a re-boot process. In addition, the maintenance manager 454 of the illustrated example stores and updates information in the AM bits 310 and the DM bits 312 of FIG. 3 to maintain consistent and durable versions of the key-value association table 108 and the local data cache 110. Information updated by the maintenance manager 454 in the AM bits 310 and the DM bits 312 may include, for example, version numbers of copies of the key-value association table 108 and the local data cache 110, garbage collection bits, valid bits, commit bits, continuation bits, data chunk length bits, and/or any other information suitable for maintaining the key-value association table 108 and the local data cache 110.

To recover and bootstrap access to the key-value association table 108 and the local data cache 110 following a re-boot process, the apparatus 450 is provided with the recovery manager 456. In the illustrated example, the recovery manager 456 is provided with the fixed physical address 134 of the recovery metadata 112 in the NVM 104 of FIG. 1. In this manner, the recovery manager 456 can retrieve the physical start addresses 122 and 124 and sizes 128 and 132 (FIG. 1) of the key-value association table 108 and the local data cache 110 to gain access to the persistent information stored therein without having to re-build the key-value association table 108 and the local data cache 110 following the re-boot process.

To maintain and verify validity of information in the key-value association table 108 and the local data cache 110, the apparatus 450 is provided with the validity manager 458. For example, the validity manager 458 can invoke garbage collection process(es) and/or revert to old version(s) of the key-value association table 108 and the local data cache 110 when newer versions were not properly committed before a failure (e.g., a system crash and/or power failure) occurred. In addition, the validity manager 458 confirms that consistency and durability of the key-value association table 108 and the local data cache 110 are maintained during operation and following system crashes and/or power failures based on the AM bits 310 and the DM bits 312 as discussed above in connection with FIG. 3. For example, following a re-boot process, the validity manager 458 determines the validity of key-value pairs (e.g., the keys 306 and the physical addresses 302 of FIG. 3) in the key-value association table 108 based on the AM bits 310 stored in association with the key-value pairs. In addition, the validity manager 458 determines the validity of the data 304 in the local data cache 110 based on the DM bits 312 stored in association with the data 304.

To manage evenly distributed wear-leveling of memory cells in the NVM 104 (FIG. 1), the apparatus 450 is provided with a wear-level manager 460. For example, the wear-level manager 460 may implement wear-leveling processes to distribute writes of key-value pairs in the key-value association table 108 and the local data cache 110 in the NVM 104 such that there is no overwriting or over-wearing of memory cell(s) of the NVM 104 relative to other memory cells of the same NVM 104 to the point at which such cell would wear significantly faster than the other memory cells. In this manner, useable life of the NVM 104 can be extended by substantially ensuring that all of its memory cells wear at substantially a same rate. Non-volatile memories, such as the NVM 104, have relatively lower write endurances than volatile memories. Wearing a memory cell of a non-volatile memory disproportionately faster than others of its memory cells would result in decreased reliability of that memory cell and, in some instances, decreased reliability of the entire non-volatile memory containing the worn memory cell.

In some examples, the wear-leveling manager 460 implements block-level wear-leveling of the NVM 104 in which wear-leveling is tracked on a per-block basis. In other examples, in addition to or instead of having a block-level wear-leveling policy, the wear-level manager 460 is provided with one or more counter(s) 462 to maintain write counts for individual or groups of memory cells of the NVM 104 storing chunks of the data 304 in the local data cache 110. The counter(s) 462 keep(s) track of memory cell writes. In this manner, the wear-level manager 460 can use count values tracked by the counter(s) 462 to identify less-worn and more-worn memory cells or groups of memory cells based on the counts. For example, based on comparisons between the values of the counter(s) 462 and count thresholds, the wear-level manager 460 may identify less-worn chunks for use in storing newly allocated blocks or write-intensive chunks. Similarly, when a chunk of memory cells is worn out after many rewrites, the wear-level manager 460 may map out the worn-out memory cells so that they are no longer used.

Non-volatile memories often implement their own internal wear-leveling processes using internal wear-leveling circuitry. In some examples, such wear-leveling management performed internal to the NVM 104 may be omitted in view of the wear-leveling processes implemented by the wear-level manager 460. In this manner, cost, space requirements, and complexity of the NVM 104 may be reduced.

Figure 5:
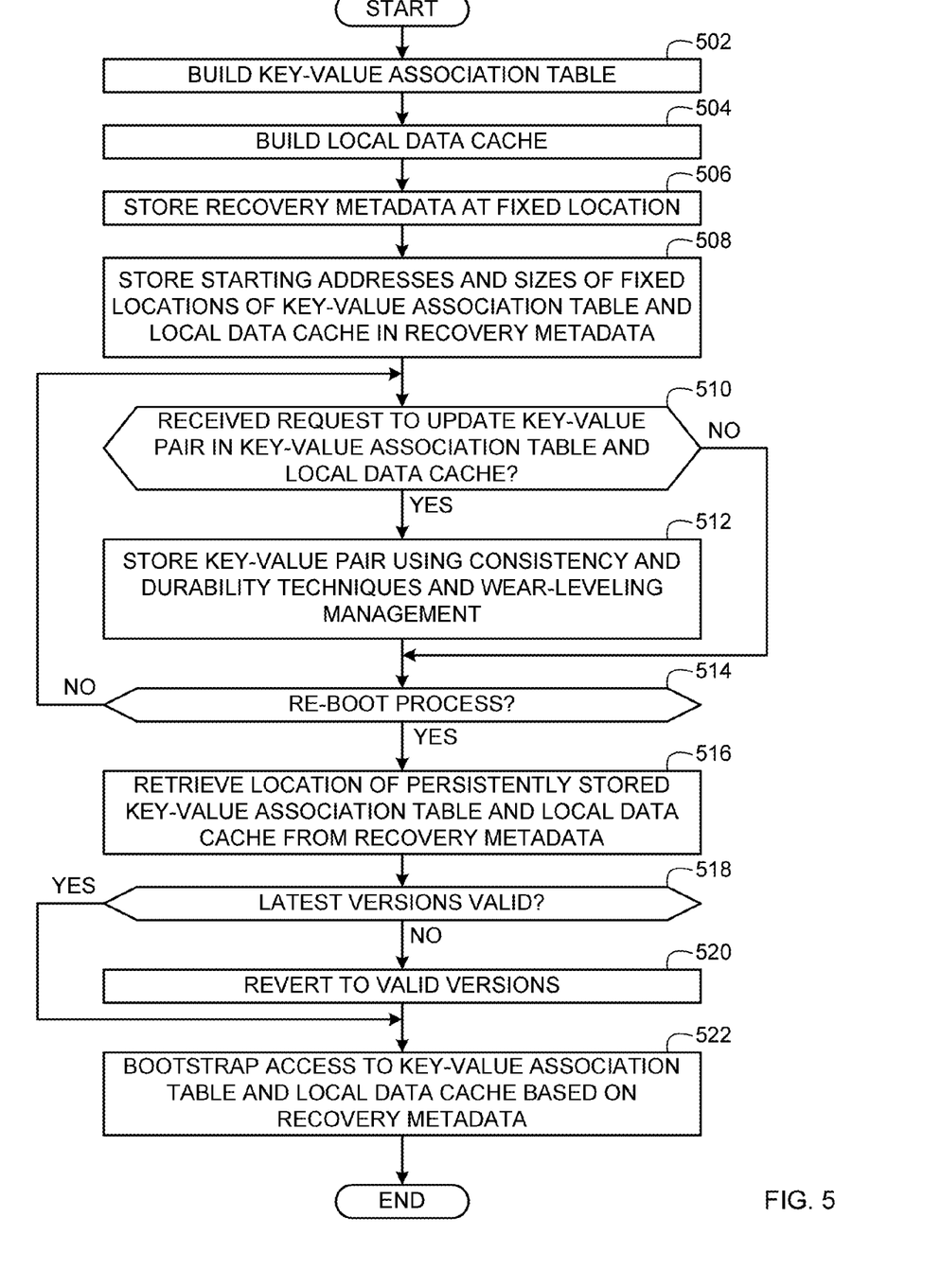
FIG. 5 illustrates a flow diagram representative of example machine readable instructions which may be executed to implement example apparatus to generate and/or maintain the non-volatile key-value association table and non-volatile data cache of FIGS. 1 and 3.

FIG. 5 is a flow diagram representative of example machine readable instructions to implement the example apparatus 450 of FIG. 4 to generate and/or maintain the non-volatile key-value association table 108 and the non-volatile local data cache 110 of FIGS. 1 and 3. The example process of FIG. 5 may be implemented using machine readable instructions that, when executed, cause a device (e.g., a programmable controller, processor (e.g., the processor 412 of FIG. 4) and/or other programmable machine or integrated circuit) to perform the operations shown in FIG. 5. For instance, the example process of FIG. 5 may be performed using a processor, a controller, and/or any other suitable processing device. For example, the example process of FIG. 5 may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example process of FIG. 5 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example process of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example process of FIG. 5 may be implemented as any combination(s) of any of the foregoing techniques, for example, any combination of firmware, software, discrete logic and/or hardware.

Although the example process of FIG. 5 is described with reference to the flow diagram of FIG. 5, other methods of implementing the process of FIG. 5 may be employed. For example, the order of execution of the blocks may be changed, and/or some of the blocks described may be changed, eliminated, sub-divided, or combined. Additionally, the example process of FIG. 5 may be performed sequentially and/or in parallel by, for example, separate processing threads, processors, devices, discrete logic, circuits, etc.

Initially, the maintenance manager 454 (FIG. 4) builds (or generates) the key-value association table 108 (block 502) at the key-value starting address 122 (FIG. 1) and builds (or generates) the local data cache 110 (block 504) at the cache starting address 124 (FIG. 1). As discussed above, the key-value association table 108 stores the physical addresses 302 pointing to entries in the local data cache 110 of data previously retrieved from one or more originating data structures or data stores (e.g., the local data store 114 and/or one or more of the remote data stores 116*a-b* of FIG. 1).

The maintenance manager 454 stores the recovery metadata 112 at a fixed location in the NVM 104 (block 506). For example, in the illustrated example of FIG. 1, the maintenance manager 454 stores the recovery metadata 112 at the fixed location starting at the recovery metadata starting address 134. In addition, the maintenance manager 454 provides the recovery metadata starting address 134 to the recovery manager 456 of FIG. 4. The maintenance manager 454 stores the starting addresses and sizes of the key-value association table 108 and the local data cache 110 in the recovery metadata 112 (block 508). For example, the maintenance manager 454 stores key-value starting address 112, the cache starting address 114, and the sizes 128 and 132 of the key-value association table 108 and the local data cache 110 in the recovery metadata 112 in association with their respective data structure IDs 126 and 130 as shown in FIG. 1.

The data access interface 452 (FIG. 4) determines whether it has received a request to update a key-value pair in the key-value association table 108 and the local data cache 110 (block 510). For example, such an update may be a write (e.g., put(k,v)), a delete, an update, etc. If the data access interface 452 determines at block 510 that it has received an update request, the data access interface 452 stores the key-value pair in the key-value association table 108 and the local data cache 110 using consistency and durability techniques and wear-level management (block 512). For example, the data access interface 452 can work with the maintenance manager 454 to ensure consistency and durability as discussed above in connection with FIGS. 3 and 4 by, for example, creating new version copies of the key-value association table 108 and the local data cache 110 and updating the AM bits 310 and the DM bits 312 of FIG. 3 to indicate proper version numbers and confirmations or non-confirmations of completed or non-completed updates. In addition, if separate garbage collection bits are used, the maintenance manager 454 can update such bits. At block 512 of the illustrated example, the data access interface 452 also works with the wear-level manager 460 (FIG. 4) to write information to the key-value association table 108 and the local data cache 110 using wear-leveling techniques as discussed above in connection with FIG. 4.

After storing the key-value pair at block 512 or if the data access interface 452 determines at block 510 that it has not received an update request, the recovery manager 456 (FIG. 4) determines if a re-boot process has recently occurred (block 514). For example, following a system crash and/or power failure or any other failure of the key-value cache server 102, the key-value cache server 102 re-starts with a re-boot process. If a re-boot process has not recently occurred, control returns to block 510. However, if the recovery manager 456 determines at block 514 that a re-boot process has recently occurred, the recovery manager 456 uses the recovery metadata starting address 134 to access the recovery metadata 112 and retrieve the starting address locations 122 and 124 of the key-value association table 108 and the local data cache 110 that are persistently stored in the NVM 104 (block 516). In this manner, the recovery manager 456 can locate the previously built and persistently stored key-value association table 108 and local data cache 110 without needing to retrieve data from originating data sources such as the local data store 114 and/or one or more of the remote data stores 116*a-b* to re-generate or re-build the key-value association table 108 and the local data cache 110.

The validity manager 458 of the illustrated example determines whether the latest versions of the key-value association table 108 and the local data cache 110 are valid (block 518). For example, the validity manager 458 can use the AM bits 310 and the DM bits 312 to determine the validity of the most recent versions of the key-value association table 108 and the local data cache 110 as discussed above in connection with FIGS. 3 and 4. If the validity manager 458 determines at block 518 that the latest version(s) of at least one of the key-value association table 108 and/or the local data cache 110 is/are not valid, the validity manager 458 reverts the at least one of the key-value association table 108 and/or the local data cache 110 to a previous valid version(s) (block 520). After reverting to a valid version(s) at block 520 or if the latest version(s) of the key-value association table 108 and the local data cache 110 is/are valid, the recovery manager 456 bootstraps access to the key-value association table 108 and the local data cache 110 based on the recovery metadata 112 (block 522). In this manner, following the re-boot, the key-value cache server 102 can relatively quickly access the previously built and persistently stored key-value association table 108 and local data cache 110 without needing to access data in an originating data source such as the local data store 114 and/or one or more of the remote data stores 116*a-b* to re-build the key-value association table 108 and the local data cache 110. The example process of FIG. 5 then ends.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture. Thus, although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to access data in non-volatile memory, the method comprising:
   generating a key-value association table in a non-volatile memory to store physical addresses of a data cache storing data previously retrieved from a data structure;
   storing recovery metadata at a location in the non-volatile memory, the recovery metadata including a first address of the key-value association table in the non-volatile memory; and
   following a re-boot process, retrieving locations of the key-value association table and the data cache using the recovery metadata without accessing the data structure to re-generate the key-value association table and the data cache.

2. A method as defined in claim 1, wherein the recovery metadata further includes a size of the key-value association table and a second address of the data cache.

3. A method as defined in claim 1, wherein the re-boot process is performed in response to a system crash or a power failure of a device storing the key-value association table, the key-value association table remaining persistently stored in the non-volatile memory at the first address through the system crash or the power failure.

4. A method as defined in claim 1, further comprising, following the re-boot process:
   determining validity of the physical addresses in the key-value association table based on management bits stored in association with the physical addresses; and
   determining validity of the data in the data cache based on data management bits stored in association with the data.

5. A method as defined in claim 1, further comprising using a wear-leveling process to adjust the physical addresses corresponding to the data of the data cache and distribute writes in the non-volatile memory based on the adjusted physical addresses.

6. An apparatus to access data, the apparatus comprising:
   a maintenance manager to store recovery metadata at a location in a non-volatile memory, the recovery metadata including a first address of a key-value association table in the non-volatile memory, the key-value association table storing physical addresses of a data cache; and
   a recovery manager to, following a re-boot process, retrieve locations of the key-value association table and the data cache using the recovery metadata without retrieving data from an originating data source to re-build the key-value association table and the data cache.

7. An apparatus as defined in claim 6 further comprising a validity manager to determine validity of the physical addresses in the key-value association table and validity of the data in the data cache, and when at least one of the key-value association table or the data cache is not valid, revert the at least one of the key-value association table or the data cache to a valid version.

8. An apparatus as defined in claim 7, wherein the validity manager is to determine the validity of the physical addresses in the key-value association table based on association management bits stored in association with the physical addresses and to determine the validity of the data in the data cache based on data management bits stored in association with the data.

9. An apparatus as defined in claim 6, wherein the maintenance manager is further to store a size of the key-value association table and a second address of the data cache in the recovery metadata.

10. An apparatus as defined in claim 6, wherein the re-boot process is performed in response to a system crash or a power failure of a device storing the key-value association table, the key-value association table to remain persistently stored in the non-volatile memory at the first address through the system crash or the power failure.

11. An apparatus as defined in claim 6, further comprising a wear-level manager to adjust the physical addresses corresponding to the data of the data cache and distribute writes in the non-volatile memory based on the adjusted physical addresses.

12. A tangible machine accessible medium having instructions stored thereon that, when executed, cause a machine to at least:
   generate a key-value association table in a non-volatile memory to store physical addresses of a data cache storing data previously retrieved from a data structure;
   store recovery metadata in the non-volatile memory, the recovery metadata including a first address of the key-value association table in the non-volatile memory; and
   following a re-boot process, retrieve locations of the key-value association table and the data cache using the recovery metadata without accessing the data structure to re-generate the key-value association table and the data cache.

13. A machine accessible medium as defined in claim 12, wherein the recovery metadata further includes a size of the key-value association table and a second address of the data cache.

14. A machine accessible medium as defined in claim 12, wherein the re-boot process is performed in response to a system crash or a power failure of a device storing the key-value association table, the key-value association table remaining persistently stored in the non-volatile memory at the first address through the system crash or the power failure.

15. A machine accessible medium as defined in claim 12 having instructions stored thereon that, when executed, cause the machine to, following the re-boot process:
   determine validity of the physical addresses in the key-value association table based on association management bits stored in association with the physical addresses; and
   determine validity of the data in the data cache based on data management bits stored in association with the data.

16. A machine accessible medium as defined in claim 12 having instructions stored thereon that, when executed, cause the machine to perform a wear-leveling process to adjust the physical addresses corresponding to the data of the data cache and distribute writes in the non-volatile memory based on the adjusted physical addresses.

17. A machine accessible medium as defined in claim 12 having instructions stored thereon that, when executed, cause the machine to store the recovery metadata at a fixed location in the non-volatile memory.

\* \* \* \* \*